(12) United States Patent
Espelien

(10) Patent No.: US 8,874,645 B2
(45) Date of Patent: Oct. 28, 2014

(54) SYSTEM AND METHOD FOR SHARING AN EXPERIENCE WITH MEDIA CONTENT BETWEEN MULTIPLE DEVICES

(75) Inventor: Joel Espelien, San Diego, CA (US)

(73) Assignee: Packetvideo Corp., San Diego, CA (US)

( * ) Notice: Subject to any disclaimer, the term of this patent is extended or adjusted under 35 U.S.C. 154(b) by 2147 days.

(21) Appl. No.: 11/707,515

(22) Filed: Feb. 16, 2007

(65) Prior Publication Data

US 2007/0276864 A1 Nov. 29, 2007

Related U.S. Application Data

(60) Provisional application No. 60/786,749, filed on Mar. 28, 2006.

(51) Int. Cl.
| | |
|---|---|
| G06F 15/16 | (2006.01) |
| H04W 4/00 | (2009.01) |
| G06Q 30/00 | (2012.01) |
| H04N 21/4788 | (2011.01) |
| H04N 21/462 | (2011.01) |
| H04N 21/84 | (2011.01) |
| H04N 7/173 | (2011.01) |
| H04N 5/44 | (2011.01) |

(52) U.S. Cl.
CPC ........... *H04N 7/173* (2013.01); *H04N 21/4788* (2013.01); *H04N 21/4622* (2013.01); *H04N 21/84* (2013.01); *H04N 5/4401* (2013.01)
USPC .......................... 709/204; 455/466; 705/14.64

(58) Field of Classification Search
USPC ..................................... 709/203, 204; 725/87
See application file for complete search history.

(56) References Cited

U.S. PATENT DOCUMENTS

| | | | |
|---|---|---|---|
| 6,167,092 | A | 12/2000 | Lengwehasatit |
| 6,498,865 | B1 | 12/2002 | Brailean et al. |
| 6,529,552 | B1 | 3/2003 | Tsai et al. |

(Continued)

FOREIGN PATENT DOCUMENTS

WO WO 2007/126724 4/2007

OTHER PUBLICATIONS

PCT Written Opinion, Jun. 13, 2008.
PCT Search Report, Jun. 13, 2008.

*Primary Examiner* — Krista Zele
*Assistant Examiner* — Margishi Desai
(74) *Attorney, Agent, or Firm* — Patents + TMS, P.C.

(57) ABSTRACT

A system and a method share an experience with media content between multiple devices for providing access to electronic program guide information and/or multimedia metadata of the media content. Users share and/or view the electronic program guide information and/or the multimedia metadata associated with the media content by transferring and/or by publishing the electronic program guide information and/or the multimedia metadata via one or more networks. Two or more participating devices establish a connection via one or more networks for a sending device to transfer the electronic program guide information and/or the multimedia metadata to one or more receiving devices via one or more networks. The electronic program guide information and/or the multimedia metadata has communications and/or comments associated with consumption of the media content. The receiving devices consume the digital multimedia file for users of the receiving devices to share in an experience of the media content with a user of the sending device. The users of the sending device and/or of the receiving devices discuss and/or comment on the experience of the media content through an asynchronous message or a communication channel in real time.

20 Claims, 4 Drawing Sheets

(56) References Cited

U.S. PATENT DOCUMENTS

| | | |
|---|---|---|
| 6,941,324 B2 | 9/2005 | Plastina et al. |
| 7,006,631 B1 | 2/2006 | Luttrell |
| 7,634,076 B2* | 12/2009 | Lee et al. .................. 379/231 |
| 2002/0033844 A1* | 3/2002 | Levy et al. .................. 345/744 |
| 2002/0120925 A1 | 8/2002 | Logan .................. 725/9 |
| 2003/0009518 A1* | 1/2003 | Harrow et al. .................. 709/203 |
| 2003/0067872 A1 | 4/2003 | Harrell et al. |
| 2003/0093267 A1 | 5/2003 | Leichtling et al. |
| 2003/0142744 A1 | 7/2003 | Wu et al. |
| 2003/0233455 A1* | 12/2003 | Leber et al. .................. 709/226 |
| 2004/0174817 A1 | 9/2004 | Jabri et al. |
| 2004/0193762 A1 | 9/2004 | Leon et al. |
| 2004/0218673 A1 | 11/2004 | Wang et al. |
| 2005/0021394 A1* | 1/2005 | Miedema et al. .................. 705/14 |
| 2005/0080846 A1* | 4/2005 | McCleskey et al. .......... 709/202 |
| 2005/0154608 A1* | 7/2005 | Paulson et al. .................. 705/1 |
| 2005/0203976 A1* | 9/2005 | Hyun et al. .................. 707/204 |
| 2005/0289027 A1* | 12/2005 | Buarque De Macedo ...... 705/31 |
| 2006/0008256 A1* | 1/2006 | Khedouri et al. ............. 386/124 |
| 2006/0013148 A1 | 1/2006 | Burman et al. |
| 2006/0029041 A1 | 2/2006 | Jabri et al. |
| 2006/0041527 A1* | 2/2006 | Fessler .................. 707/1 |
| 2006/0047704 A1* | 3/2006 | Gopalakrishnan .......... 707/104.1 |
| 2006/0056416 A1 | 3/2006 | Yang et al. |
| 2006/0101499 A1* | 5/2006 | Aravamudan et al. .......... 725/86 |
| 2006/0159037 A1 | 7/2006 | Jabri et al. |
| 2006/0176877 A1 | 8/2006 | Jabri et al. |
| 2006/0190966 A1* | 8/2006 | McKissick et al. ............. 725/61 |
| 2006/0206580 A1* | 9/2006 | Johnson, III .................. 709/217 |
| 2006/0277288 A1* | 12/2006 | Kelly et al. .................. 709/223 |
| 2006/0282319 A1* | 12/2006 | Maggio .................. 705/14 |
| 2008/0212945 A1* | 9/2008 | Khedouri et al. ............. 386/124 |
| 2009/0019490 A1* | 1/2009 | Tanikawa .................. 725/44 |
| 2009/0106355 A1* | 4/2009 | Harrow et al. ................. 709/203 |
| 2009/0138922 A1* | 5/2009 | Thomas et al. .................. 725/87 |

* cited by examiner

SYSTEM AND METHOD FOR SHARING AN EXPERIENCE WITH MEDIA CONTENT BETWEEN MULTIPLE DEVICES

This application claims the benefit of U.S. Provisional Application Ser. No. 60/786,749, filed Mar. 28, 2006.

BACKGROUND OF THE INVENTION

The present invention generally relates to a system and a method for sharing an experience with media content between multiple devices. More specifically, the present invention relates to a system and a method for sharing an experience with media content between multiple devices to allow a first user to share the experience with the media content of the first user with second users. The system and the method may access and/or may transfer electronic program guide information of the first user and/or of the second users, multimedia metadata associated with the media content and/or the media content between a device of the first user and/or devices of the second users. The electronic program guide information and/or the multimedia metadata may relate to, may be associated with and/or may correspond to the experience of the first user and/or of the second users with consuming and/or with viewing the media content. The electronic program guide information and/or the multimedia metadata may be transferred, may be accessible and/or may be published for consuming and/or for viewing by the devices via one or more networks. As a result, the first user and/or the second users may consume, may access, may modify and/or may comment on the experience with consuming and/or with viewing the media content. Moreover, the sending device and/or the receiving devices may access, may view and/or may consume the electronic program guide and/or the multimedia metadata for sharing the experience of the media content in real time or asynchronously.

The devices may establish a connection via one or more networks to publish and/or to indicate a presence and/or an availability to participate in sharing of the experience with the media content via the connection. One of the devices may transfer and/or may publish information relating to and/or corresponding to a digital multimedia file for receiving by, for accessing by and/or for consuming by the devices. The information may relate to and/or may correspond to the digital multimedia files which may have been consumed in the past, may be currently being consumed and/or may be consumable at a future time. As a result, the second users of the devices may share in the experience with the first user. The first user and/or the second users may use a connection between the devices via one or more networks to discuss and/or to share the experience through asynchronous messages and/or a communication channel in real time.

It is generally known for example that an electronic program guide is used to describe media content available for consumption by a user of a digital media device. It is also generally known that rating services for television and/or for radio and/or media published information and/or data associated with consumption of media content is viewed and/or is accessed by consumers prior to consumption of the media content by the consumers. The information includes, for example, a statistical estimate of the number of consumers of a television show and/or a radio program and/or a ranking of music albums or songs by gross sales and/or by radio airplay.

A website tracks and/or records information and/or data associated with consumption behaviors of media content by subscribers of the website. The information is published in an aggregate and/or is used by the website to provide marketing material to one or more of the subscribers. However, the information is not generally made available to the subscribers.

Another website provides, for example, the number of subscribers logged onto the website, the number of subscribers accessing and/or consuming the media content from the website, a playlist of one or more of the subscribers of the website and/or information associated with and/or based on the playlist of one or more of the subscribers.

Furthermore, it is also known that electronic devices communicate and/or transmit an availability or a presence to other electronic devices over a communication network. A capability is commonly provided by an instant messaging (hereinafter "IM") application and/or a text messaging application to allow users to view, to access and/or to identify whether other users are available to communicate via the IM application and/or the text messaging application. A presence is also used by voice over Internet Protocol (hereinafter "VOIP") application to provide information based on and/or corresponding to the availability of the users in support of voice communications via the VOIP application.

Of course, consumers of multimedia content are capable of communicating and/or of sharing information and/or data corresponding to and/or associated with the media content via a private communication channel, such as, for example, a conversation, a letter, a telephone call, an electronic mail, an instant message and/or the like. However, the consumers of the media content are unable to publish and/or to transmit the information and/or the data via a connection on a network between two or more electronic devices. Further, the consumers of the media content are unable to identify and/or to determine a presence of a user over a network for accessing, for viewing and/or for consuming the information and/or the data from one of the consumers to determine whether to access, to view and/or to consume the media content. Still further, the connection between the consumers does not allow and/or does not permit the consumers to communicate the information and/or the data of the media content through asynchronous messages and/or a communication channel in real time. Moreover, the connection does not identify and/or publish a playlist and/or information of the playlist of the consumers for determining whether to access, to view and/or to consume the media content in the playlist of the consumers.

A need, therefore, exists for a system and a method for sharing an experience with media content between multiple devices. More specifically, a need exists for a system and a method for sharing an experience with media content between multiple devices to access and/or to transfer electronic program guide information and/or multimedia metadata of the media content with more than one device. Further, a need exists for a system and a method for sharing an experience with media content between multiple devices which may allow users to share, to view, to access and/or to consume information and/or data relating to and/or corresponding to the media content. Still further, a need exists for a system and a method for sharing an experience with media content between multiple devices which may allow users to transfer and/or to publish information and/or data relating to and/or corresponding to the media content between the devices via one or more networks. Moreover, a need exists for a system and a method for sharing an experience with media content between multiple devices to distribute information which may be based on an availability of the devices and/or a presence of the devices on one or more networks. Furthermore, a need exists for a system and a method for sharing an experience with media content between multiple devices which may provide an electronic program guide to the users as the user interface for accessing, for viewing and/or for consuming information and/or data relating to and/or corresponding to the media content.

SUMMARY OF THE INVENTION

The present invention generally relates to a system and a method for sharing an experience with media content between multiple devices. More specifically, the present invention relates to a system and a method for sharing an experience with media content between multiple devices which may provide a shared access to electronic program guide information, multimedia metadata of the media content and/or the media content between the multiple devices. The system and the method may allow users to share, to access, to view and/or to consume information relating to the media content by transferring and/or by publishing the information between the devices via one or more networks. Two or more participating devices may establish a connection via one or more networks to display information based on and/or corresponding to an availability and/or a presence for participation of the two or more participating devices.

In an embodiment of the present invention, a method for a first user and a second user to share an experience of a media file is provided, the method comprising the steps of: connecting a first device to a second device via a network; connecting the first device to a media provider wherein the media provider transmits the media file to the first device; consuming the media file on the first device; generating a first communication by the first user using the first device; associating the first communication with the media file; generating multimedia information wherein the multimedia information indicates the availability of the multimedia file and the associated first communication; transmitting the multimedia information from the network to the second device; allowing the second user to initiate consumption of the media file and the associated first communication; associating a second communication to the media file wherein the second communication is generated by the second user using the second device; and transmitting the second communication from the second device to the first device.

In an embodiment, the method further comprises the step of displaying a graphic user interface on the second device wherein the user selects the multimedia information from the graphic user interface to initiate consumption of the media file.

In an embodiment, the method further comprises the step of transmitting the first communication from the first device to the second device.

In an embodiment, the method further comprises the step of connecting a third device to the network wherein the first communication is transmitted to the second device and the third device.

In an embodiment, the method further comprises the step of transmitting a third communication to the first device and the second device from a third user consuming the media file on a third device.

In an embodiment, the method further comprises the step of transmitting the media file from a database connected to the second device.

In an embodiment, the method further comprises the step of storing the media file and the first communication in a database accessible by the second device.

In an embodiment, the method further comprises the step of transmitting the media file to the second device from a media provider connected to the network.

In an embodiment, the method further comprises the step of storing the media file, the first communication and the second communication in a database accessible by the first device.

In an embodiment, the method further comprises the step of displaying an electronic program guide that lists available media files and associated communications that are accessed by the second device.

In another embodiment, a system for a first user and a second user to share an experience of a media file is provided. The system has a first device wherein the first user consumes the media file using the first device and generates a first communication wherein the first device associates the media file and the first communication; a second device connected to the first device by a first network wherein the first network transmits multimedia information about the media file that indicates an association of the first communication with the media file; and a media provider connected to the second device wherein a selection of the multimedia information from an electronic program guide causes the media provider to transmit the media file and the network to transmit the first communication wherein the user uses the second device to consume the media file and the first communication wherein the second user generates a second communication transmitted to the first device.

In an embodiment, the system has a graphic user interface that displays the electronic program guide and allows the user to select the media file.

In an embodiment, the system has a second network that connects the second device to the media provider.

In an embodiment, the system has a server connected to the first network wherein the server transmits the media file from the media provider to the second device via the first network.

In an embodiment, the electronic program guide displays available media files and associated communications that are accessed by the second device.

In an embodiment, the system has a database that stores the media file, associated first communication and associated second communication wherein the database is connected to the first network.

In an embodiment, the system has a third device connected to the network wherein the first communication and the second communication are transmitted to the third device.

In another embodiment, a system for a first user and a second user to communicate regarding consumption of a media file is provided. The system has a first device wherein the first user consumes the media file using the first device; a first media provider that transmits the media file to the first device; a second device that displays an electronic program guide that lists available media files; a network that connects the second device to the first device wherein the network transmits multimedia information to the second device wherein the multimedia information is related to the media file that indicates consumption of the media file by the first user wherein the multimedia information is displayed in the electronic program guide; and a second media provider connected to the second device wherein the second device obtains the media file from the second media provider wherein the second user consumes the media file on the second device wherein the first user generates a first communication that is transmitted to the second device wherein the second user generates a second communication that is transmitted to the first device.

In an embodiment, the system has a database connected to the first device wherein the first user accesses the media file, the first communication and the second communication from the database.

In an embodiment, the system has a third device connected to the network wherein the third device allows a third user to generate a third communication transmitted to the first device and the second device.

It is, therefore, an advantage of the present invention to provide a system and a method for sharing an experience with media content between multiple devices.

Another advantage of the present invention is to provide a system and a method for sharing an experience with media content between multiple devices which may provide a sending device to transfer and/or to publish information relating to and/or corresponding to the media content for accessing, for consuming, for receiving and/or for viewing by one or more receiving devices. And, another advantage of the present invention is to provide a system and a method for sharing an experience with media content between multiple devices which may provide information related to the media content consumed in the past, currently being consumed, or for consuming at a future time.

And, another advantage of the present invention is to provide a system and a method for sharing an experience with media content between multiple devices which may provide receiving devices to display and/or to consume information relating to and/or corresponding to the media content to users via an audio element, a video element and/or a graphical element incorporatable into a user interface of the multiple devices.

A further advantage of the present invention is to provide a system and a method for sharing an experience with media content between multiple devices which incorporates rendering elements into an electronic program guide interface for providing a feature within an interface for viewing, for accessing and/or for consuming information relating to and/or corresponding to the media content that may be familiar to the users.

Moreover, an advantage of the present invention is to provide a system and a method for sharing an experience with media content between multiple devices which may share information with receiving devices for accessing, for viewing and/or for consuming the media content as a sending device may allow recipients to conveniently share in the experience of the media content with the sending device.

And, another advantage of the present invention is to provide a system and a method for sharing an experience with media content between multiple devices which may use a connection via one or more networks to discuss and/or to publish the experience with the media content through asynchronous messages or a communication channel in real time.

Yet another advantage of the present invention is to provide a system and a method for sharing an experience with media content between multiple devices which may send information of the media content automatically without any manual involvement by the user. Another advantage of the present invention is to provide a system and a method for sharing an experience with media content between multiple devices which may access and/or may transfer electronic program guide information, multimedia metadata of the media content and the media content between the multiple devices.

A still further advantage of the present invention is to provide a system and a method for sharing an experience with media content between multiple devices which may distribute information relating to and/or based on the media content to devices based on an availability of the devices and/or a presence of the devices via one or more networks.

Moreover, an advantage of the present invention is to provide a system and a method for sharing an experience with media content between multiple devices which may provide an electronic program guide to users as a user interface for accessing, for viewing and/or for consuming information relating to and/or corresponding to the media content.

Additional features and advantages of the present invention are described in, and will be apparent from, the detailed description of the presently preferred embodiments and from the drawings.

DETAILED DESCRIPTION OF THE PREFERRED EMBODIMENTS

The present invention generally relates to a system and a method for sharing an experience with media content between multiple devices. More specifically, the present invention relates to a system and a method for sharing an experience with media content between multiple devices which may provide access to electronic program guide information, multimedia metadata of the media content and/or the media content. The system and the method may allow users to share, to consume and/or to view the electronic program guide information and/or multimedia metadata relating to, associated with and/or corresponding to the media content. Two or more participating devices may establish and/or may open a connection via one or more networks to transfer and/or to publish the electronic program guide information and/or the multimedia metadata relating to, associated with and/or corresponding to the media content to one or more receiving devices via one or more networks. The electronic program guide information and/or the multimedia metadata may be related to, may be associated with and/or may correspond to the media content which may have been consumed in the past, may be currently being consumed, or may be consumable at a future period in time. The electronic program guide information and/or the multimedia metadata may have communications and/or comments relating to, associated with and/or corresponding to consumption of the digital media file and/or the media content.

The receiving devices may access, may view and/or may consume the media content as the sending device may allow users of the receiving devices to share in an experience of the digital multimedia file with a user of the sending device. The users of the sending device and/or the receiving devices may use the connection to discuss and/or to comment on the experience of the digital multimedia file through an asynchronous message or a communication channel in real time. The users of the sending device and/or the receiving devices may share the experience of the media content between the sending device and the receiving devices via an electronic program guide of a content provider and/or one or more networks.

Figure 1:
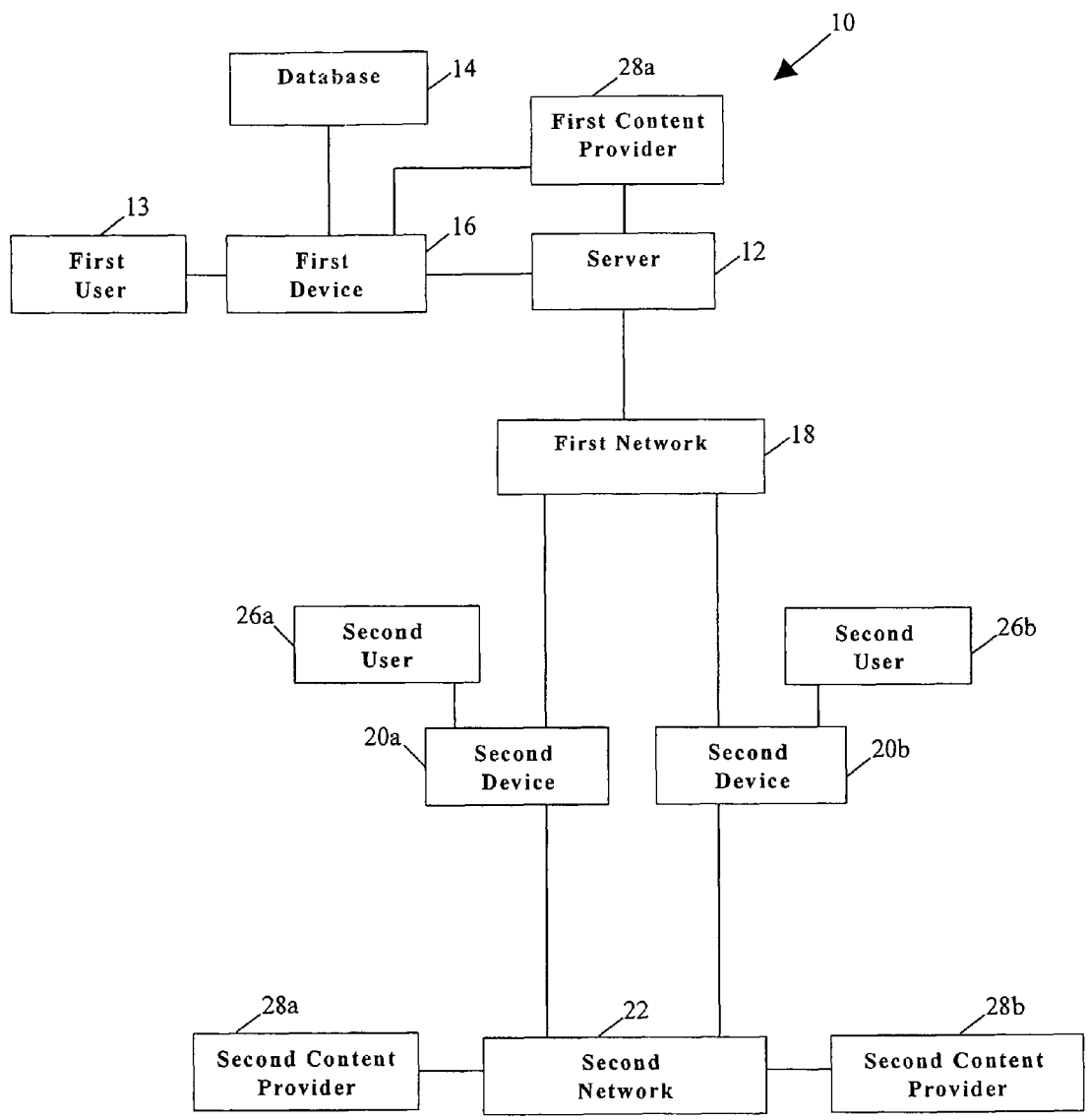
FIG. 1 illustrates a black box diagram of a system for sharing an experience with media content between multiple devices in an embodiment of the present invention.
Figure 2:
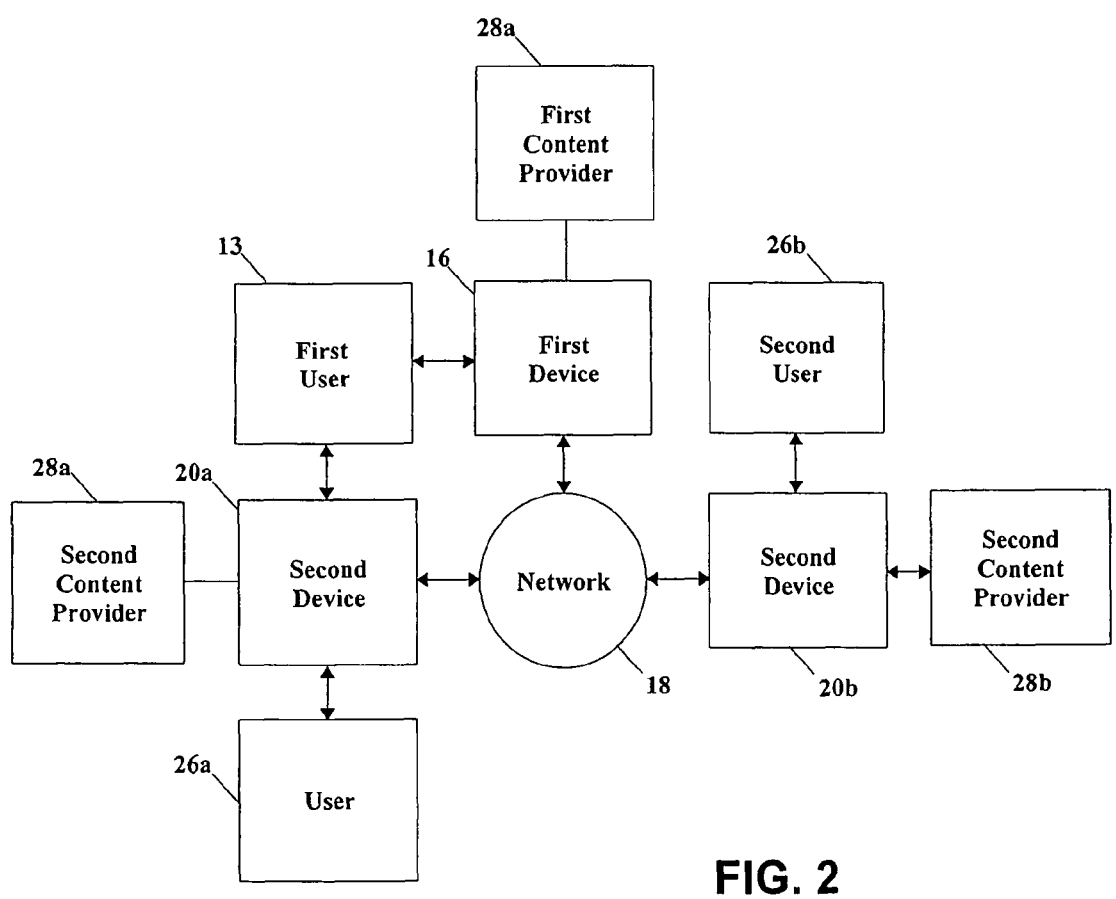
FIG. 2 illustrates a black box diagram of a system for sharing an experience with media content between multiple devices in an embodiment of the present invention.
Figure 3:
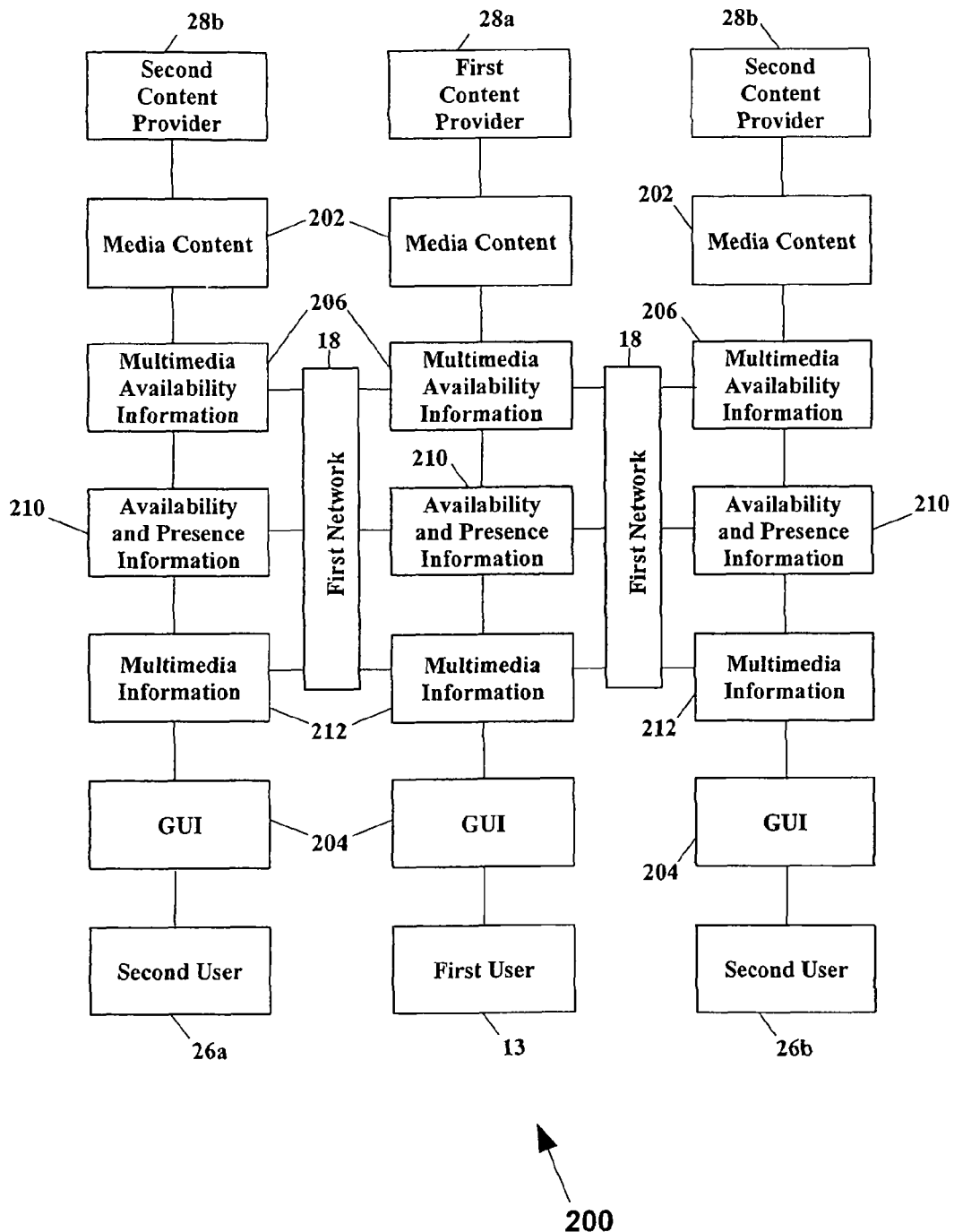
FIG. 3 illustrates a black box diagram of a system for sharing an experience with media content between multiple devices in an embodiment of the present invention.

Referring now to the drawings wherein like numerals refer to like parts, FIGS. 1-3 illustrate a systems 10, 100, 200, respectively, which may have a first device 16 which may be connected to and/or may be in communication with a first data communication network 18 (hereinafter "the first network 18"). As shown in FIG. 1, the first device 16 may have a database 14 and/or may be connected to the first network 18 via a server 12. Second devices 20*a*, 20*b* may be connected to and/or in communication with the first device 16 via the first network 18 and/or the server 12. The database 14 and/or the server 12 may be local or may be remote with respect to the first device 16. The second devices 20*a*, 20*b* may be local and/or may be remote with respect to the first device 16, the database 14 and/or the server 12. Alternatively, the first device 16 and/or the second devices 20*a*, 20*b* may be connected via the first network 18 as shown in FIGS. 1-3. As a result, the server 12 may not be required in the system 10 for connecting the first device 16 to the second devices 20*a*, 20*b*.

The first device 16 and/or the second devices 20*a*, 20*b* may be a digital media device, for example, a digital television, an internet radio receiver, a digital video disc player, a satellite radio receiver, a digital audio player, a digital video player and/or a personal video recorder. Further, the first device 16 and/or the second devices 20*a*, 20*b* may be a digital media device, such as, a personal computer, a laptop computer, a media player, a game console, a set top box, a gateway, a portable media device, a mobile phone, personal digital assistant and/or the like. The present invention should not be deemed as limited to a specific embodiment of the first device 16 and/or the second devices 20*a*, 20*b*. It should be understood that the first device 16 and/or the second devices 20*a*, 20*b* may be any digital media device capable of accessing, of displaying, of rendering and/or of consuming the multimedia as known to one of ordinary skill in the art.

The database 14 of the first device 13 and/or the second devices 20*a*, 20*b* may have, may contain and/or may store media content 202 and/or multimedia as shown in FIG. 3. The media content 202 and/or the multimedia may be digital media files, such as, for example, audio signals, still images, video frames, data feeds, data streams, program guides, text information, musical compositions, radio programs, audio books, audio programs, cable television programs, satellite television programs, public access programs, motion pictures, animated works, music videos, animated works, video programs, video games and/or soundtracks and/or video tracks of audiovisual works, dramatic works, film scores and/ or an operas and/or the like. The digital media files, the media content 202 and/or the multimedia may be data for the digital media files, a subset of the data for the digital media files or may have a pointer or a uniform resource locator (hereinafter "URL") to access and/or to obtain the digital media files and/or the media content 202. For example, the media content 202 and/or the digital media file for a live television broadcast may contain data, such as, for example, a date, a time, a channel and/or a service provider. The digital video file and/or the media content 202 may have a network location to access, to receive, to download and/or to stream the digital video file and/or the media content 202. The present invention should not be deemed as limited to specific embodiments of the digital media files, the media content 202 and/or the multimedia. It should be understood that the data, the media content 202 and/or the digital media files or the multimedia may be any data and/or any digital media file or any multimedia, respectively, as known to one of ordinary skill in the art.

Each digital media file, the media content 202 and/or the multimedia which may be stored in the database 14 may have, for example, multimedia metadata. The multimedia metadata may be, for example, a communication and/or information which may be associated with, may relate to and/or may correspond to the digital media file, the multimedia, the media content 202 and/or the first device 16. The communication and/or the information may be, for example, text, a graphic, a URL, a broadcast channel, a voice recording, a video recording, a conferencing recording, a comment, a note, a review, a correspondence, a commentary, a message, a discussion, a notice, a bulletin, a memorandum, news and/or the like. It should be understood that the communication and/or the information may be any communication and/or any information as known to one of ordinary skill in the art.

The first device 16, the second devices 20*a*, 20*b*, the server 12 and/or the database 14 may have a guide application, such as, for example, an electronic program guide application, an interactive program guide application and/or the like. The guide application may search, may locate, may identify, may navigate, may search and/or may select the digital media files, the media content 202, the multimedia and/or the multimedia metadata in the database 14. The guide application may have a graphical user interface 204 (hereinafter "GUI 204") for displaying multimedia availability information 206 corresponding to, associated with and/or based on the digital media files, the media content 202, the multimedia and/or the multimedia metadata as shown in FIG. 3. The multimedia availability information 206 may indicate and/or may display whether the digital media files, the multimedia and/or the media content 202 may be available to, may be accessible by, may be receivable by and/or may be consumable by the first device 16 and/or by the second device 20*a*, 20*b*. The multimedia availability information 206 may display permitted times of, permitted locations of and/or sources of the digital media files, the multimedia and/or the media content 202. It should be understood that the guide application may be any guide application as known to one having ordinary skill in the art.

The digital media files, the media content 202 and/or the multimedia which may be available to the first device 16 and/or the second devices 20*a*, 20*b* may be displayed in the multimedia availability information 206 via the GUI 204 of the first device 16 and/or of the second devices 20*a*, 20*b* as shown in FIG. 3. The GUI 204 of the first device 16 and/or the second devices 20*a*, 20*b* may display the multimedia availability information 206 in a display format, such as, for example, a two dimensional grid of rows and columns or a three dimensional view of objects in a virtual space. Further, the multimedia availability information 206 which may be presented by the GUI 204 may be derived from a standard data format, such as, for example XML, MPEG2 Transport, RDF, RSS, ATOM, SOAP, MathML, XHTML, SVG, cXML or from a proprietary data format. It should be understood that the display format of the GUI 204 and/or the standard data format of the GUI 204 may be any display format and/or any standard data format, respectively, as known to one having ordinary skill in the art.

The first device 16 may publish, may broadcast, may distribute and/or may present availability and presence information 208 of the first device 16 to the second devices 20*a*, 20*b* via the first network 18 as shown in FIG. 3. Further, the second devices 20*a*, 20*b* may publish, my broadcast, may distribute and/or may present availability and presence information 208 of the second devices 20*a*, 20*b* to the first device 16 via the first network 18. The availability and presence information 208 of the first device 16 and/or the availability and presence information 208 of the second devices 20*a*, 20*b* may indicate and/or may display whether the first device 16 and/or each of the second devices 20*a*, 20*b* may be available to, may be accessible by and/or may be connected to the first network 18. Further, the availability and presence information 208 of the first device 16 and/or the availability and presence information 208 of the second devices 20a, 20b may indicate whether the first device 16 and/or the second devices 20a, 20b may be accessing, viewing, displaying, rendering and/or consuming the digital media files, the media content 202 and/or the multimedia.

The availability and presence information 208 of the first device 16 and/or the availability and presence information 208 of the second devices 20a, 20b may be displayed, may be accessed, may be rendered and/or may be consumed via the GUI 204 of the first device 16 and/or the second devices 20a, 20b, respectively. The availability and presence information 208 of the first device 16 and/or the availability and presence information 208 of the second devices 20a, 20b may be published and/or may be displayed in a standard presence format such as, for example, SIP, SIMPLE, XMPP, a proprietary presence format and/or the like. It should be understood that the standard presence format of the availability and presence information 208 may be any standard presence format as known to one of ordinary skill in the art.

Second users 26a, 26b of the second devices 20a, 20b, respectively, may be in communication with a first user 13 of the first device 16 via the server 12 and/or the first network 18 as shown in FIG. 1. As a result, the second users 26a, 26b may connect to the first user 13, the first device 16 and/or the database 14 of the first device 16 via the second devices 20a, 20b, respectively. The first device 16 may transmit, may publish and/or may broadcast multimedia information 212 relating to, associated with and/or corresponding to the digital media files, the media content 202, the multimedia and/or the multimedia metadata to second devices 20a, 20b via the first network 18 as shown in FIG. 3. The second devices 20a, 20b may access, may receive and/or may display the multimedia information 212 of the digital media file, the media content 202 and/or the multimedia metadata which may be consumed by or which may have been consumed by the first device 16.

The first device 16 may transmit, may publish and/or may broadcast the multimedia information 212 and/or the multimedia metadata to the second devices 20a, 20b based on a subscription model, such as, for example, a subscription push model and/or the like. Alternatively, the second devices 20a, 20b may request and/or may access the multimedia information 212 and/or the multimedia metadata from the first device 16 based on an authorization model, such as, for example, an authorization pull model and/or the like. The present invention should not be deemed as limited to a specific embodiment of the subscription model and/or the authorization model for receiving, for accessing and/or for transmitting the multimedia information 212 and/or the multimedia of the digital media files, the media content, and/or the multimedia.

The second users 26a, 26b may browse, may view, may access and/or may identify the multimedia information 212 and/or the multimedia metadata received from the first device 16 via the GUI 204 of the second devices, 20a, 20b, respectively. The second users 26a, 26b may select, may identify and/or may access the digital media files, the media content 202 and/or the multimedia consumed by the first user 13 of the first device 16. The second devices 20a, 20b may access, view and/or consume the digital media files, the media content 202 and/or the multimedia via the first device 16 or via accessing, viewing and/or consuming the digital media files, the media content 202 and/or the multimedia from content providers 28a, 28b, respectively. The second terminals 20a, 20b may connect to and/or may be in communication with the content providers 28a, 28b via a second data communication network 22 (hereinafter "the second network 22") as shown in FIG. 1. In an embodiment, the second devices 20a, 20b may access, may view and/or may consume, for example, a photograph or a home movie from the database 14 via the first device 16 and/or the first network 18. In another embodiment, the second devices, 20a, 20b may access, may view and/or may consume, for example, a music album from the content providers 28a, 28b via the second network 22.

The first network 18 and/or the second network 22 may be a fixed network, such as, for example, a cabled network, a permanent network and/or the like. The first network 18 and/or the second network 22 may be a temporary network, such as, for example, a modem network, a null modem network and/or the like. The first network 18 and/or the second network 22 may be, for example, a local area network, a metropolitan area network, a wide area network, a personal area network and/or the like. Alternatively, the first network 18 and/or the second network 22 may be a wireless network, such as, for example, a wireless metropolitan area network, a wireless local area network, a wireless personal area network, a global standard network, a personal communication system network, a pager-based service network, a general packet radio service, a universal mobile telephone service network, a radio access network and/or the like. The present invention should not be limited to a specific embodiment of the first network 18 and/or the second network 22. It should be understood that the first network 18 and/or the second network 22 may be any network capable of transferring and/or of transmitting the multimedia, the media content 202 and/or the digital media files as known to one having ordinary skill in the art.

The second devices 20a, 20b may be remotely connected to the server 12 via the first network 18 and/or to the content providers 28a, 28b via the second network 22. The server 12 and/or the content providers 28a, 28b may broadcast, may stream, may transfer and/or may transmit the multimedia, the media content 202 and/or the digital media files to the second devices 20a, 20b via the first network 18 and/or the second network 22, respectively. The multimedia, the media content 202 and/or the digital media files may be rendered, may be displayed, may be viewed, may be consumed and/or may be reproduced to the second users 26a, 26b via the second devices 20a, 20b, respectively. As a result, the second users 26a, 26b may perceive, may observe and/or may witness an experience of the digital media files, the media content 202 and/or the multimedia during consumption of, viewing of and/or rending of the digital media files, the media content 202 and/or the multimedia via the second terminals 20a, 20b, respectively.

The first user 13 and/or the second users 20a, 20b may transmit one or more communications and/or one or more comments relating to, associated with and/or corresponding to the experience of the multimedia, the media content 202 and/or the digital media files via the first device 16 and/or the second devices 20a, 20b. The communications and/or the comments may be incorporated into, may be associated with and/or may be integrated into the multimedia information 212 and/or the multimedia metadata which may be transmitted between the first device 16 and/or the second devices 20a, 20b via the first network 18. The communications and/or the comments may be accessed, may be rendered, may be viewed and/or may be consumed by the first user 13 and/or the second users 26a, 26b via the GUI 204 and/or output means (not shown in the figures) of the first device 16 and/or of the second devices 20a, 20b, respectively. The communications and/or the comments may be, for example, a text communication, a graphical communication, an audio communication, an audiovisual communication, a multimedia communication and/or the like. The present invention should not be deemed as limited to a specific embodiment of the communications and/ or the comments within the multimedia information 212 and/or the multimedia metadata of the digital media files, the media content 202 and/or the multimedia.

The graphical communication may be, for example, an interaction with visual icons which may indicate feelings, emoticons, avatars, reactions and/or ratings for the experience of the digital media files, the media content 202 and/or the multimedia. The audio communication may be, for example, a real time voice, voice messages and/or sound effects. The audiovisual communication or a multimedia communication may be a video conference which may contain one or more of the above-identified communications. The communications and/or the comments may be integrated, may be presented and/or may be stored as part of or an enhancement to the electronic program guide information for the multimedia, the media content 202 and/or the digital media files. As a result, the first user 13 and/or the second users 26a, 26b may access, may review, may revise and/or may replay the experience of the multimedia, the media content 202 and/or the digital media files at a time period after or in a future with respect to the experience of the multimedia, the media content 202 and/or the digital media files.

The first device 16 and/or the second devices 20a, 20b may share, may transfer and/or may transmit the multimedia availability information 206, the availability and presence information 208, the multimedia information 212, the communications, the comments and/or the multimedia metadata via the first network 18 and/or the second network 22. The multimedia availability information 206, the availability and presence information 208, the multimedia information 212, the communications, the comments and/or the multimedia metadata may be rendered, may be accessed, may be displayed, may be consumed, may be rendered and/or may be reproduced via the first device 16 and/or the second devices 20a, 20b. The multimedia availability information 206, the availability and presence information 208, the multimedia information 212, the communications, the comments and/or the multimedia metadata may be stored in and/or may be retrievable from the second devices 20a, 20b, the first device 16 and/or the database 14 of the first device 16.

For example, the user 26b may access, may receive, may render and/or may view the multimedia information 212, the multimedia metadata, the communications and/or the comments of the digital media files and/or the media content 202 from the second device 20a of the user 26a and/or from the first device 16 of the first user 13. The multimedia metadata, the communications, the comments and/or the multimedia information 212 may be transmitted, may be shared and/or may be transferred between the second devices 20a, 20b and/or the first device 16 in a standard communication protocol. The protocol may be a data networking protocol, such as FTP, HTTP, UDP, TCP, IP, IMAP, IRC, NNTP, POP3, SIP, MMS, SMS, XMPP, MTP, SMTP, SNMP, SSH and/or the like. The present invention should not be limited to a specific embodiment of a data networking protocol.

FIG. 2 illustrates a system 100 for sharing the experience of the multimedia, the media content 202 and/or the digital media files between the first device 16 and the second devices 20a, 20b via the first network 18. The first device 16 may be connected to and/or may be in communication with the second devices 20a, 20b via the first network 18. The first device 16 and/or the second devices 20a, 20b may be connected to and/or may be in communication with the content providers 28a-28c, respectively, for receiving, for accessing, for downloading, for rendering and/or for consuming the multimedia, the media content 202 and/or the digital media files. The first user 13 and/or the second users 26a, 26b may view, may experience, may perceive and/or may witness the multimedia, the media content 202 and/or the digital media files via the first device 16 and/or the second devices 20a, 20b. The first user 13 and/or the second users 20a, 20b may publish, may transmit, may broadcast and/or may send the multimedia information 212, the multimedia metadata, the communications and/or the comments relating to, based on and/or corresponding to the experience of the multimedia, the media content 202 and/or the digital media files via the first network 18.

The second users 26a, 26b may access, may view, may render and/or may consume the multimedia information 212, the multimedia metadata, the communications and/or the comments of the experience with the multimedia, the media content 202 and/or the digital media content by the first user 13 via the first device 16, the second devices 20a, 20b and/or the first network 18. The multimedia information 212, the multimedia metadata, the communications and/or the comments may be accessed, may be rendered, may be viewed and/or may be consumed by the first users and/or the second users 26a, 26b via the GUI 204 and/or the output means of the first device 16 and/or the second devices 20a, 20b, respectively. The second users 26a, 26b may determine and/or may identify whether to access, to view, to download and/or to consume the multimedia, the media content 202 and/or the digital media files based on the multimedia information 212, the multimedia metadata, the communications and/or the comments of the experience with the multimedia, the media content 202 and/or the digital media files by the first user 13. The multimedia information 212, the multimedia metadata, the communications and/or the comments may be integrated, may be presented and/or may be stored as part of or an enhancement to the electronic program guide information and/or the GUI 204 of the second devices 20a, 20b.

The second users 26a, 26b may download, may access, may receive and/or may consume the multimedia, the media content 202 and/or the digital media files from the content providers 28b, 28c via the second devices 20a, 20b as shown in FIGS. 1-3. The second user 26a, 26b may view, may experience, may perceive and/or may witness the multimedia, the media content 202 and/or the digital media files via the second devices 20a, 20b, respectively. The second user 26a, 26b may add to, may create, may modify and/or may change the multimedia information 212, the multimedia metadata, the communications and/or the comments of the experience of the multimedia, the media content 202 and/or the digital media files based on an experience by the second users 26a, 26b via the second devices 20a, 20b. The second users 26a, 26b may transmit, may send, may publish and/or may broadcast the multimedia information 212, the multimedia metadata, the communications and/or the comments of the experience with the multimedia, the media content 202 and/or the digital media files by the second users 26a, 26b to the first device 16 of the first user 13 via the second devices 20a, 20b and/or the first network 18. The first user 13 and/or the second users 20a, 20b may store, may save and/or may retrieve the experience with the multimedia, the media content 202 and/or the digital media files by the first user 13 and/or by the second users 20a, 20b via the first device 16 and/or the second devices 26a, 26b.

Figure 4:
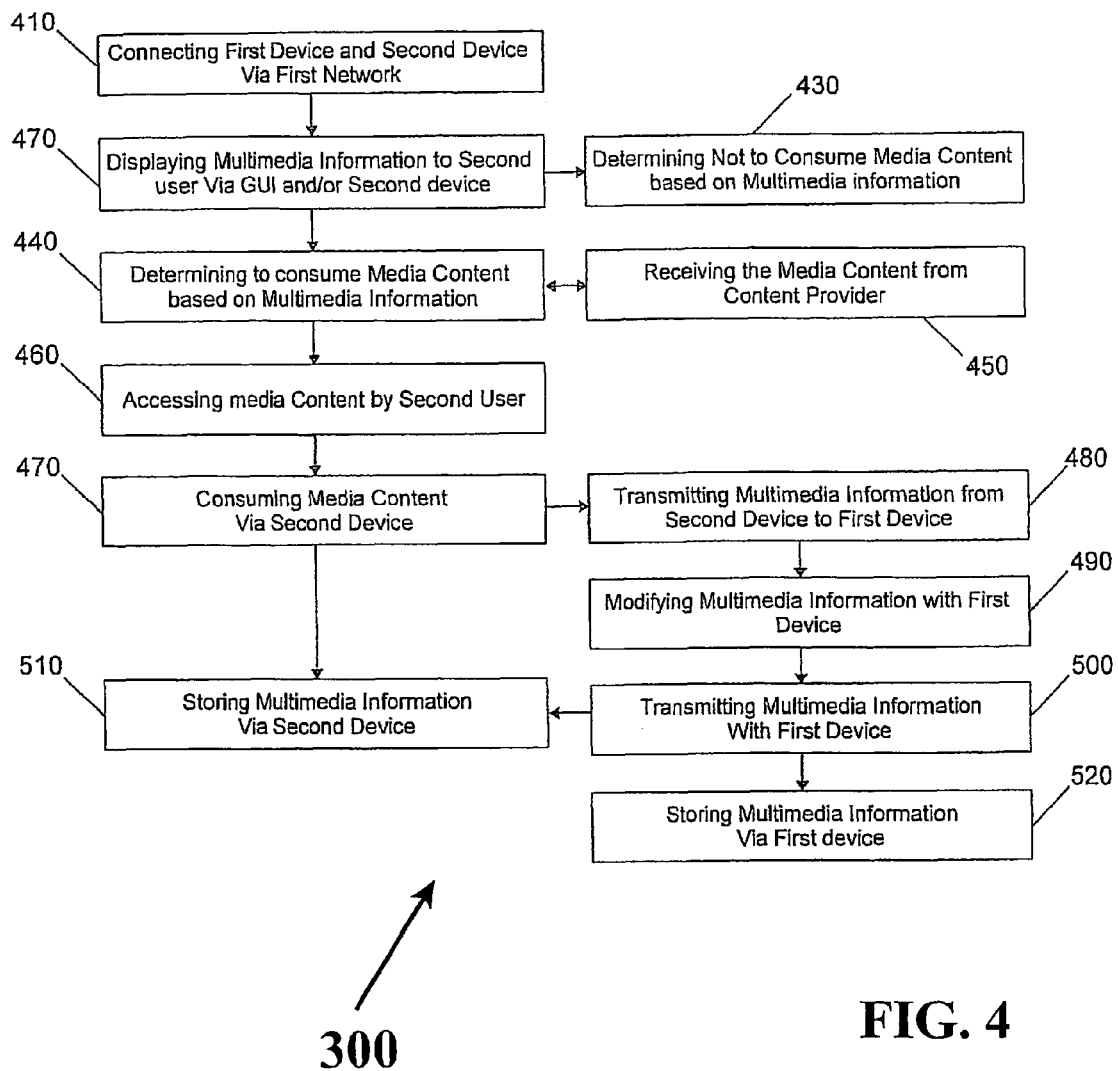
FIG. 4 illustrates a flowchart of a method for sharing an experience with media content between multiple devices in an embodiment of the present invention.

FIG. 4 illustrates a method 400 for transferring the multimedia availability information 206, the availability and presence information 208 and/or the multimedia information 212 (collectively referred to hereinafter as "the multimedia information 401") between the first device 16 and the second devices 20a, 20b in an embodiment of the present invention. The second device 20a may connect to the first device 16 via the first network 18 as shown at step 410. The second device 20a may receive the multimedia information 401 from the first device 16 over the first network 18. The first device 16 may display, may broadcast and/or may publish the multimedia information 401 via the first network 18. The second device 20a may access, may display, may render and/or may consume the multimedia information 401 from the first device 16 via the first network 18. The multimedia information 401 from the first device 16 may be viewed by the second user 26a via the GUI 204 of the second device 20a as shown at step 420.

The GUI 204 of the second device 20a may display the communications and/or the comments of the experience with the media content 202 by the first user 13. The second user 26a may view, may consume and/or may receive the communications and/or the comments of the experience with the media content 202 by the first user 13 via the GUI 204 of the second device 20a. The second user 26a may not consume the media content 202 based on the communications and/or the comments in the multimedia information 401 displayed and/or rendered by the second device 20a as shown at step 430. Alternatively, the second user 26a may consume the media content 202 based on the communications and/or the comments in the multimedia information 401 displayed and/or rendered by the second device 20a as shown at the step 440. The second user 26a may receive, may obtain, may request and/or may download the media content 202 from the content provider 28b as shown at step 450. Alternatively, the second user 26a may access the media content 202 from the second device 20a, from the first device 16 and/or from the database 14 as shown at step 460.

The second user 26a may render, may view, may display and/or may consume the media content 202 via the second device 20a as shown at step 470. The second user 26a may modify, may add to and/or may revise the communications and/or the comments in the multimedia information 401 to correspond with the experience of the media content 202 by the second user 26a. The second user 26a may transmit and/or may publish the multimedia information 401 to the first user 13 of the first device 16 via the first network as shown at step 480. The first user 13 may modify, may add to and/or may revise the communications and/or the comments in the multimedia information 401 based on the experience with the media content 202 by the first user 13 as shown at step 490.

The second device 20a may receive, may display, may access, may render and/or may consume the multimedia information 401 from the first device 13 via the first network 18. The multimedia information 401 may be stored in and/or may be retrieved by the second device 20a as shown at step 510. The second user 26a may access, may view and/or may consume the multimedia information 401 at the time period after the experience of the media content 202 by the second user 26a via the second device 20a. The multimedia information 401 may be stored in and/or may be retrieved by the first device 16 as shown at step 520. Alternatively, the first user 13 may store the multimedia information 401 which may be received from the second device 20a via the first device 13 without modifying, adding to and/or revising the communications and/or the comments within the multimedia information 401. The first user 13 may access, may view and/or may consume the multimedia information 401 at a future time after the experience of the media content 202 by the second user 26a.

The systems 10, 100, 200 and the method 400 share the experience with the media content 202 by the first user 13 and the second users 26a, 26b between the first device 16 and the second devices 20a, 20b. The first user 13 and the second users 26a, 26b may share, may consume and/or may view the electronic program guide information and/or the multimedia metadata relating to, associated with and/or corresponding to the media content 202 by transferring and/or by publishing the electronic program guide information and/or the multimedia metadata between the first device 13 and/or the second devices 20a, 20b via the first network 18. The first device 16 may transfer and/or may publish the electronic program guide information and/or the multimedia metadata relating to, associated with and/or corresponding to the media content 202 via the second devices 20a, 20b. The electronic program guide information and/or the multimedia metadata of the media content 202 may have the communications and/or the comments relating to, associated with and/or corresponding to consumption of the media content by the first user 13. The first user 13 and the second users 26a, 26b may use the connection via the first network 18 to discuss and/or to comment on the experience of consuming the media content 202 through an asynchronous message or a communication channel in real time. The first user 13 and/or the second users 26a, 26b may share the experience of consuming the media content 202 between the first device 16 and/or the second devices 20a, 20b via the GUI 204 which may be displayed on the first device 16 and/or the second devices 20a, 20b.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A method for a first user and a second user to share an experience of a media file using a first device and a second device connected to a network wherein the first device and the second device are different devices and further wherein the media file encodes media content, the method comprising the steps of:

rendering the media content of the media file on the first device;

generating a first communication by the first user using the first device after initiating rendering of the media content of the media file on the first device wherein the first communication is based on user input by the first user on the first device;

associating the first communication with the media file;

displaying an electronic program guide on the second device wherein the electronic program guide indicates available media files and further wherein the electronic program guide indicates the rendering of the media content of the media file by the first device;

rendering the media content of the media file on the second device in response to selection of the media file from the electronic program guide wherein the selection of the media file is based on user input by the second user on the second device; and displaying the first communication on the second device.

2. The method of claim 1 further comprising the step of:

generating a second communication by the second user using the second device after initiating rendering of the media content of the media file on the second device wherein the second communication is based on user input by the second user on the second device and further wherein the second device transmits the second communication to the first device.

3. The method of claim 1 further comprising the step of:
transmitting the first communication from the first device to the second device using a first network wherein the media file is transmitted to the second device from a media provider that is remote from the first device and the second device using a second network that is a different network than the first network.

4. The method of claim 1 further comprising the step of:
transmitting the first communication to a third device connected to the network wherein the first communication is displayed on the third device.

5. The method of claim 1 further comprising the step of:
displaying the first communication on the second device during rendering of the media content of the media file by the second device.

6. The method of claim 1 further comprising the step of:
transmitting the media file to the second device from the first device in response to selection of the media file from the electronic program guide by the second user.

7. The method of claim 2 further comprising the step of:
displaying the second communication on the first device during a subsequent rendering of the media content of the media file by the first device.

8. The method of claim 1 wherein the first communication has a text communication and further wherein the second device displays the text communication.

9. The method of claim 1 wherein the first communication has an audio communication and further wherein the second device renders the audio communication.

10. The method of claim 1 wherein the second device uses the electronic program Guide to display the first communication before the second user selects the media file from the electronic program guide.

11. A system for a first user and a second user to share an experience of a media file that provides media content, the system comprising:
a first device that renders the media content of the media file wherein the first device generates a first communication based on user input by the first user on the first device wherein the first device associates the media file and the first communication;
a second device connected to the first device by a first network wherein the first network transmits multimedia information about the media file that indicates an association of the first communication with the media file; and
a media provider connected to the second device wherein a selection of the multimedia information from an electronic program guide on the second device causes the media provider to transmit the media file to the second device and the first network to transmit the first communication to the second device and further wherein the second device renders the first communication and the media content of the media file wherein the media provider is remote from the first device and the second device.

12. The system of claim 11 wherein the first device generates the first communication before the first device renders the media content of the media file.

13. The system of claim 11 further comprising:
a second network that connects the second device to the media provider wherein the first network is a different network than the second network and further wherein the media provider transmits the media file to the first device using the second network.

14. The system of claim 11 wherein the first device generates the first communication during rendering of the media content of the media file.

15. The system of claim 11 wherein the second device uses the electronic program guide to indicate that the first device is connected to the first network.

16. The system of claim 11 wherein the first device and the second device render the media content of the media file substantially simultaneously.

17. The system of claim 11 wherein the second user generates a second communication transmitted to the first device and further wherein the second communication is based on user input by the second user on the second device.

18. A system for a first user and a second user to communicate regarding media content encoded by a media file, the system comprising:
a first device wherein the first user renders the media content encoded by the media file using the first device;
a second device that displays an electronic program guide that lists available media files; and
a network that connects the second device to the first device wherein the network transmits multimedia information to the second device and further wherein the multimedia information indicates rendering of the media content encoded by the media file by the first user wherein the multimedia information is displayed in the electronic program guide wherein the second device renders the media content encoded by the media file in response to selection of the media file from the electronic program guide.

19. The system of claim 18 wherein the first device generates a communication based on user input by the first user on the first device and further wherein the second device displays the communication.

20. The system of claim 18 further comprising:
a first media provider connected to the first device wherein the first media provider transmits the media file to the first device; and
a second media provider connected to the second device wherein the second media provider transmits the media file to the second device and further wherein the second media provider is remote from the first media provider, the first device and the second device.

* * * * *